Nov. 16, 1926. 1,607,411
O. J. OLM
AUXILIARY BRAKE
Filed Nov. 15, 1922   3 Sheets-Sheet 2
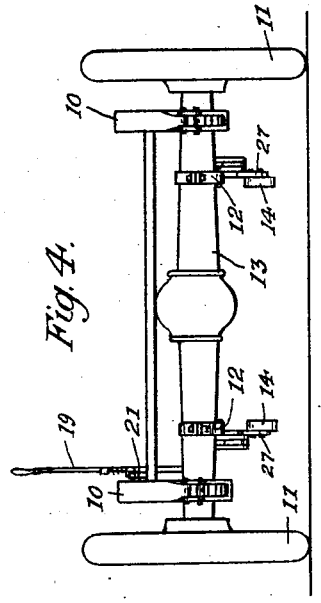
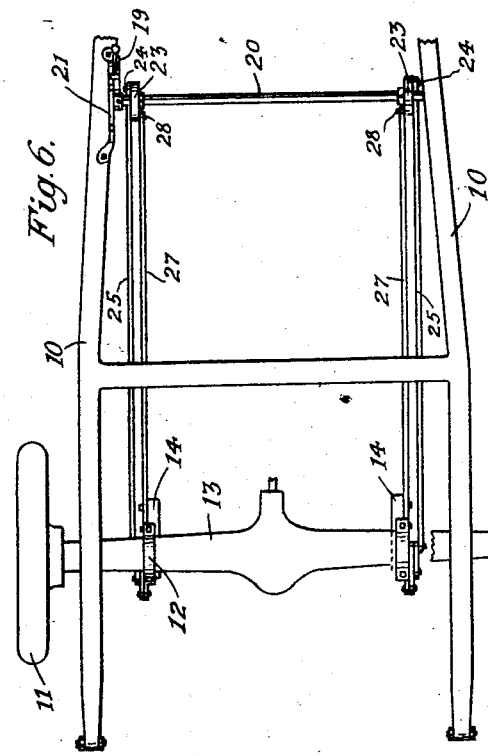
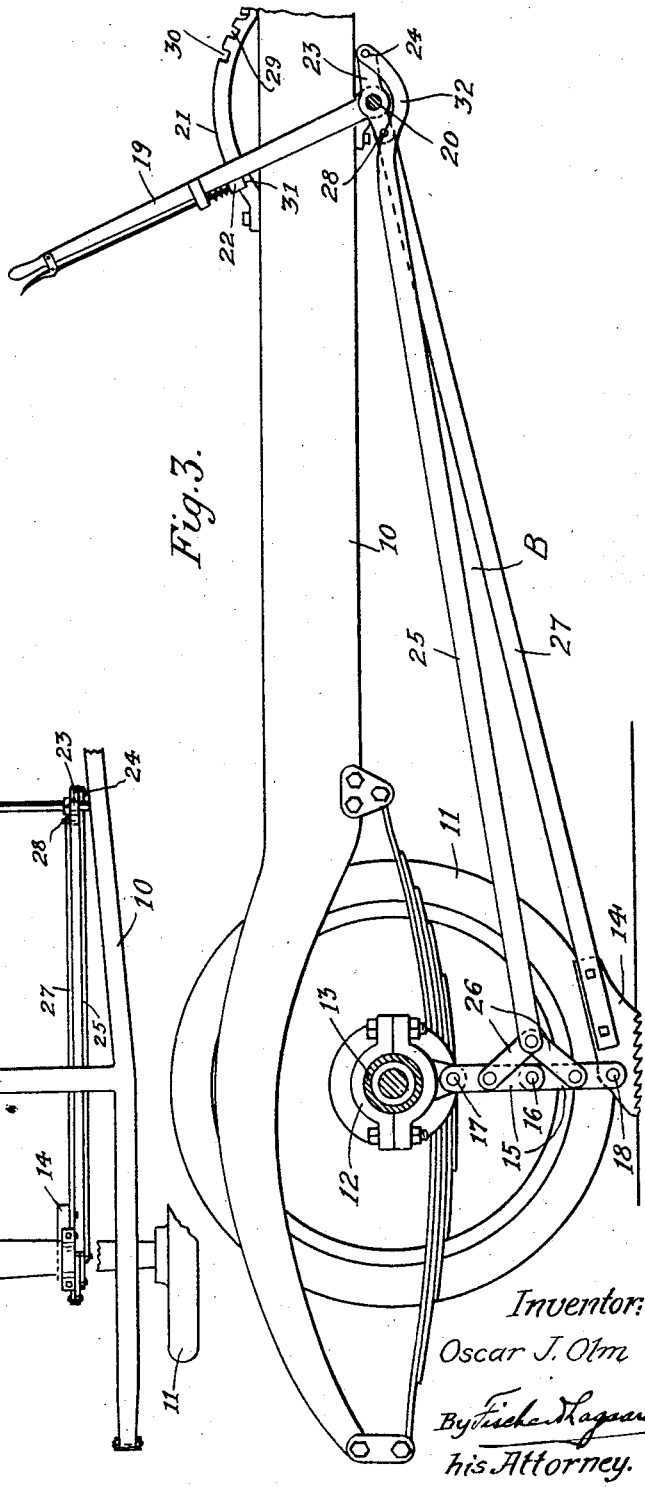
Inventor:
Oscar J. Olm
By Fischer Lagaard
his Attorney.

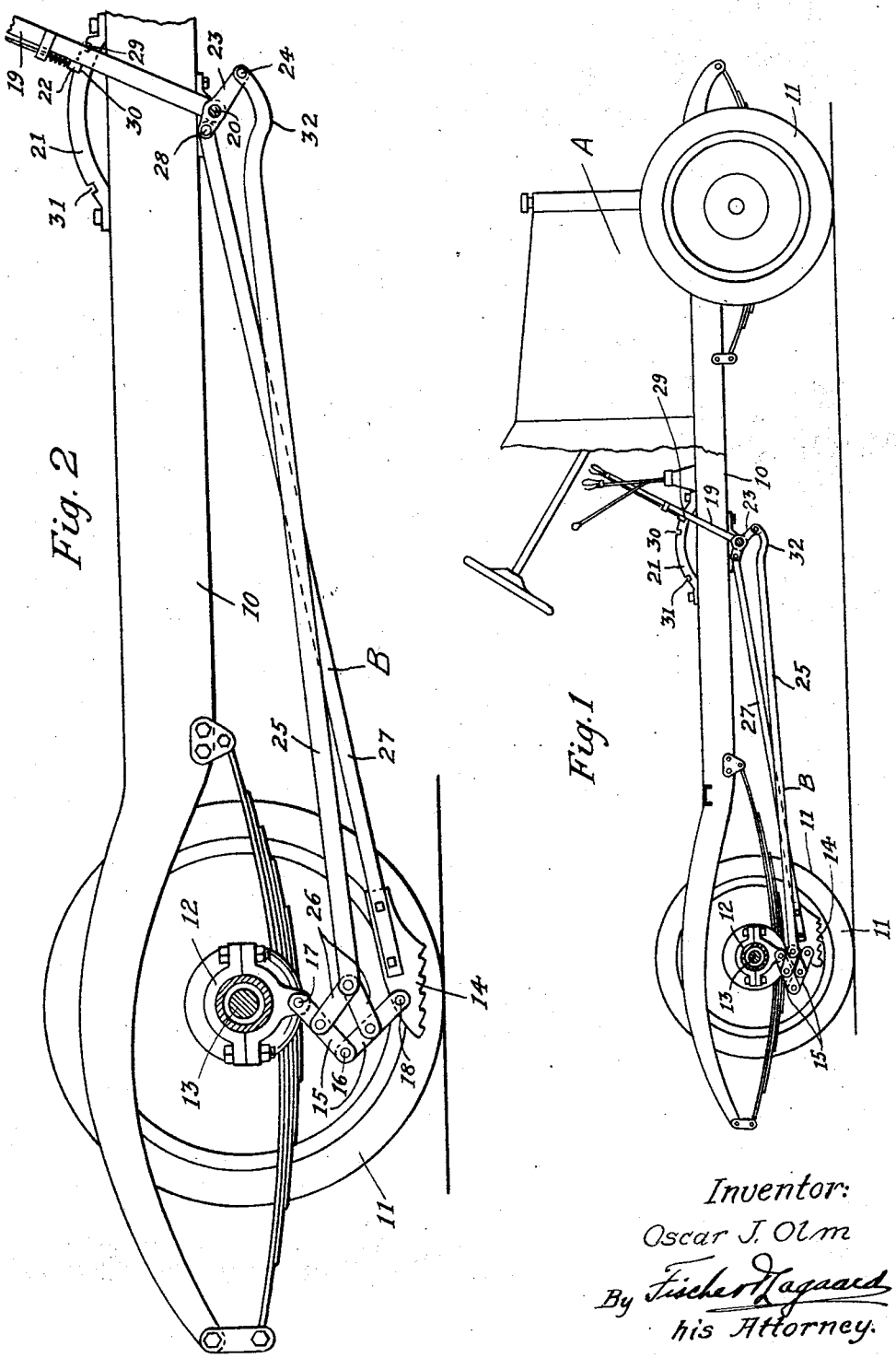

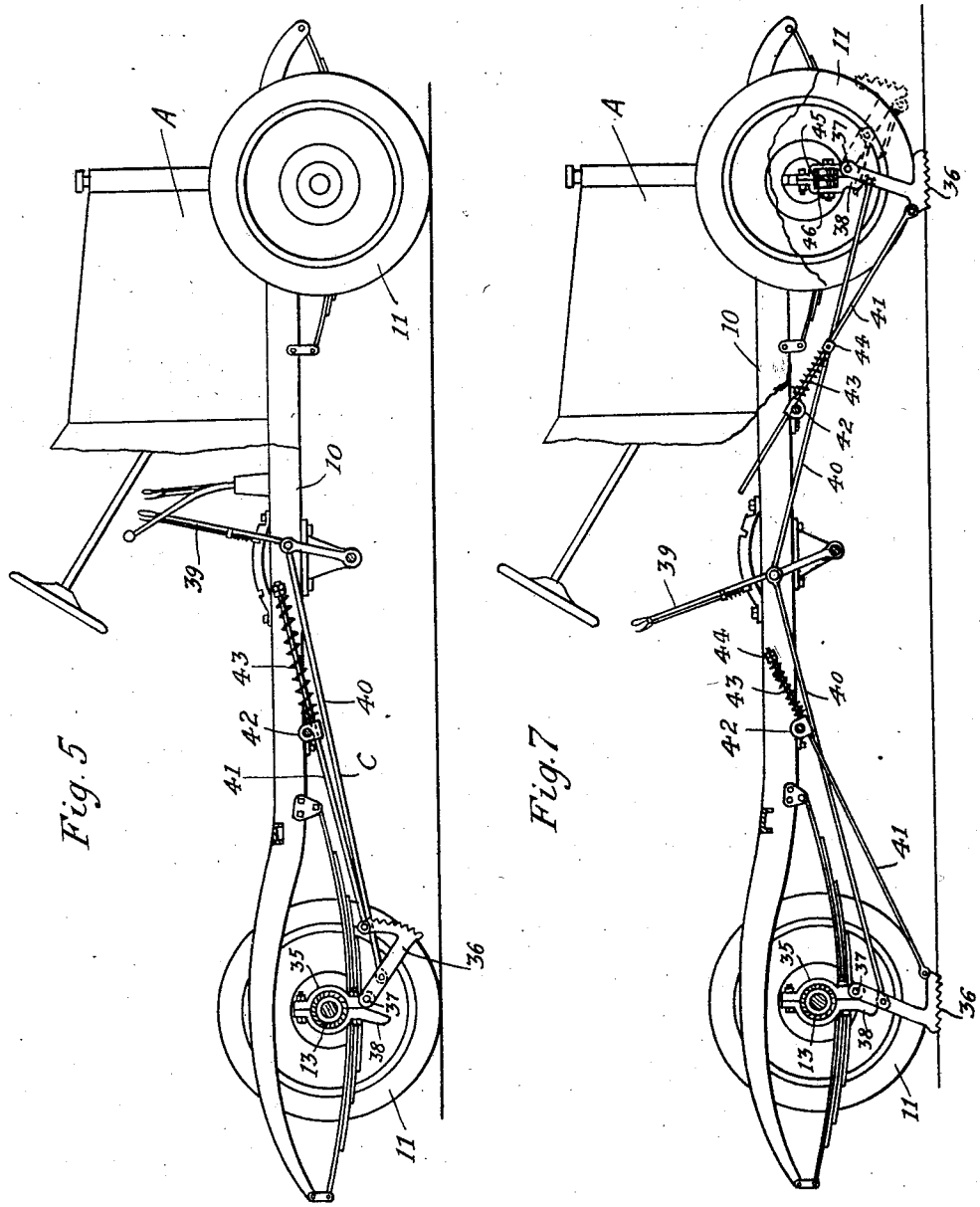

Patented Nov. 16, 1926.

1,607,411

UNITED STATES PATENT OFFICE.

OSCAR J. OLM, OF MINNEAPOLIS, MINNESOTA.

AUXILIARY BRAKE.

Application filed November 15, 1922. Serial No. 601,061.

This invention relates to automobiles wherein it is desired to provide a device which can be attached to any machine and operated to stop the same as quickly as possible irrespective of the speed of travel. Motor vehicles skid very easily under various conditions and even though the brakes may be in very good working order they are not sufficient to stop the vehicle in extreme circumstances where it is desired to make a quick stop to avoid skidding and an accident.

It is a feature of this invention to provide a simple mechanism which is readily attached to the motor vehicle in a manner so as to become very effective and easily operated.

The invention further includes a mechanism adapted to elevate the wheels of the motor vehicle out of contact with the surface of the road or pavement and to bring the gripping means into contact with the road which is designed to stop the motor vehicle very quickly. The device is easily operated without any attention as to the clutch or brakes of the vehicle when it is desired to stop the same, making it only necessary for the operator to throw the braking mechanism into operating position which elevates the driving wheels off the ground and brings the operating shoes into position to rigidly and firmly engage so as to allow the wheels to continue to operate freely without effecting the stopping of the vehicle.

Further, the invention provides means which can be folded into a small space beneath the running gear or chassis out of the way, not interfering with the general appearance of the same and yet providing a very effective operating means.

The invention may be used to form an essential part of a motor vehicle in that it provides a means for raising the wheels so that a tire can be readily changed when desired. It also provides means for elevating the wheels with the tires off the ground so that the weight of the car can be taken off the tires, a feature which is desirable and which has proven to materially lengthen the life of the tires. A device of this nature will be readily appreciated by any owner of a motor vehicle, if for no other reason than to take the place of the ordinary jack for raising the wheels and surely the advantage of elevating at least the driving wheels of the vehicle off the ground without any attention to the releasing of the clutch or brakes is of a material advantage to a motorist in a critical moment when it is desired to stop the vehicle.

In the drawings forming part of this specification:

Fig. 1 is a side elevation of a portion of the motor vehicle illustrating my device attached thereto.

Fig. 2 is an enlarged detail of a portion of the vehicle illustrating the device of the invention in a different position.

Fig. 3 is an enlarged detail of a portion of the vehicle as it would appear when the driving wheels are elevated off the ground by the invention.

Fig. 4 is a rear view of a portion of a motor vehicle illustrating the invention.

Fig. 5 illustrates an alternative form of the invention.

Fig. 6 is a plan view of the form illustrated in Figure 5.

Fig. 7 illustrates the form of the invention of Figure 5 as applied to the front and back wheels of a motor vehicle.

In the drawings, a portion of a motor vehicle is illustrated having the ordinary longitudinally extending frame members 10 which are adapted to support the body of the vehicle. These members are connected by means of the springs in the ordinary, well known manner to the wheels 11 of the vehicle.

To effect a quick means for stopping the motor vehicle A, I provide an auxiliary braking mechanism B which is attached by the clamp 12 to the rear axle 13 of the vehicle. The clamp 12 assembles about the axle and is rigidly secured thereto.

To the lower portion of the clamp 12, a drag shoe or ground engaging member 14 is secured by means of the links 15 constituting toggle lever members which are pivotally connected at 16 and the ends of which are pivotally connected at 17 and 18 to the clamp 12 and the shoe 14 respectively.

In the use of my invention, the auxiliary braking mechanism B is provided with its pair of drag shoes 14 which are positioned near either end of the axle 13 or as closely as possible to the wheels and springs which support the vehicle, the clamp 12 serving to hold the shoes in position on the axle.

An operating lever 19 is rigidly secured to the transversely extending shaft 20 which is held in suitable bearings on either end to the frame members 10. The lever 19 is provided with a quadrant 21 which is adapted to be engaged by the lever catch 22 in the respective notches formed in the quadrant to hold the lever in the desired position.

A pair of crank members 23 are keyed or otherwise secured to the shaft 20 so as to be operated when the lever 19 rotates the shaft 20. To one end of the cranks 23 is pivotally secured at 24 an operating rod 25 which is pivotally connected by means of the links 26 to the links 15 so as to support the drag shoes 14.

When the lever 19 is operated, the rods 25 together with the links 26 cause the shoes 14 to be raised and lowered as desired. To operate the cranks 23 so as to rotate the pivot point 20 sufficiently to move the shoes 14 to the desired position, brace rods 27 are rigidly secured on one end to the shoes 14 while the forward end is pivotally connected at 28 to the cranks 23. This connection to the cranks 23 further assists materially in breaking the toggle when the need for my device has ceased. These rods take the strain off the connecting and supporting links 15 and assist in holding the operating rods 25 and connecting links 26 in position to hold the shoes 14, particularly when the shoes are engaging the ground under a heavy strain. When the operating lever 19 is in the position illustrated in Figure 1, the shaft 20 is rotated into position to the rods 25 and 27 to hold the drag shoes 14 elevated directly beneath the chassis and in position below the axle 13. In this position, the catch 23 engages in the notch 29 of the quadrant 21. A second notch 30 is positioned a short distance from the notch 29 which is adapted to hold the lever in position with the shoe partially released from its retracted position while the third notch 31 in the quadrant 21 is adapted to hold the shoes 14 into operating position. The lever rods 25 are formed with an offset portion 32 which permits them to escape the shaft 20 when the lever 19 is in the position illustrated in Figure 3 with the shoes 14 engaging the ground.

In operation, the auxiliary braking mechanism B is adapted to take the place of an emergency brake at a critical moment and by engaging the lever 19 and drawing it from the position illustrated in Figure 1 into the position illustrated in Figure 3 causes the shoes 14 to engage the ground and elevate the rear wheels 11 of the vehicle so that it is not even necessary to pay any attention to the operation of the clutch or the ordinary brakes of the motor vehicle. The brake mechanism B can be readily released when not desired for use by moving the lever 19 into its forward position.

My auxiliary braking mechanism is equally valuable as a jack for elevating the wheels so that they are off the ground.

The auxiliary braking mechanism B can be attached readily to any motor vehicle at a small cost and it provides the necessary safety means which is very desirable to prevent skidding and to quickly stop the movement of the vehicle at a dangerous moment.

When the mechanism B is in operation with the shoes 14 engaging the ground as illustrated in Figure 3, the levers 25 and 27 are practically in line with the center of the shaft 20 and thus any strain on the same forms a direct force in line with the center of the shaft so as not to draw any undue strain on the operating lever 19. When the shoes 14 are in operation, the pivot points of the links 15 are practically in line and thus hold the shoe in position to support the vehicle but readily released by the hand operation of the lever 19.

In Figure 5, an alternative construction of braking mechanism C is illustrated which is supported to the axle by means of a suitable clamp 35 which is adapted to support the drag shoes 36 which are pivotally connected to the same at 37, in a manner to be swung up out of operating position. A suitable downwardly projecting stop is formed on the clamp 35 to limit the movement of the shoes 36. In this construction, the shoes 36 are brought into operating position by the operating lever 39 which is connected by means of the rod 40 to the shoe 36.

The shoes 36 are provided with braces 41 which are connected to the forward end of the shoe on one end of the rod while the other end of the rod is supported in a bearing 42 to allow the shoe 36 to be moved into operating position. The rod 41 carrys a heavy coil spring 43 on its forward end which is positioned with the stop nuts 44 on the outer end of the rod and bearing 42. This coil spring 43 is released when the shoe 36 is out of operating position and held beneath the chassis as illustrated in Figure 5. When the shoe 36 is brought into operation by the lever 39 the coil spring 43 is adapted to cushion the engaging force of the shoe 36 with the ground and thus materially reducing the strain or sudden blow against the stops 38. In this construction, two shoes are used for each axle which are positioned as close as possible to the wheels so as to provide the necessary supporting means to hold the vehicle elevated when the shoes are in operating position as illustrated in Figure 7.

In Figure 7, I have also illustrated in vehicle A equipped with a pair of shoes for the front axle 45 which are held by suitable clamps 46. These shoes function in the same manner as those attached to the rear axle 13.

It may only be preferred to have the auxiliary brake attached to the rear axle and in that case, no connection is desired for the shoes to the front axle. In the construction illustrated in Figure 7, the rods 41 for the front shoes 36 are pivotally connected to the back of the shoe in place of the front and the compression spring 43 is held between the bearing 42 and the lock nuts 44 which are positioned on the rod between the shoe and the bearing. In this manner the springs operate to relieve the strain on the stop 38 of the front clamp 46.

The advantages of the invention are very apparent as associated with a motor vehicle for the emergency brakes together with the ordinary foot brake on an automobile is very apt to be worn so as not to operate properly or be out of order at the time when they are most needed, while my invention can be in readiness for operation at any time so as to stop the motor vehicle or prevent it from skidding.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

I claim:

1. An emergency brake and jack for a motor vehicle comprising a drag shoe, means for supporting said shoe directly below the axle of the vehicle, an operating lever, a shaft therefor, a crank upon said shaft, an operating rod and a stay rod connecting said crank with said drag shoes.

2. An emergency brake and jack comprising a pair of ground engaging members, toggle lever members connected with said ground engaging members, means for connecting said toggle levers to the axle of the motor vehicle, a stay rod connected to said ground engaging members, an operating rod connected to said toggle members, an operating lever, a shaft adapted to be operated by said lever and crank means connecting said operating rod and stay rod with said shaft in a manner to be operated by said lever to cause said ground engaging member to jack up a motor vehicle off its wheels to stop the same.

3. An emergency jack and brake for a motor vehicle comprising ground engaging members, means for supporting said members in a manner to hold the same out of operating position beneath the chassis of the vehicle, an operating lever, a shaft adapted to be operated by said lever, crank means connected to said shaft and to said ground engaging members and to said supporting means, stay members connected to said supporting means adapted to brace said ground engaging members against engaging stress with the ground, said supporting means being connected with said crank means in a manner to be operated by said operating lever to move the ground engaging members into or out of engagement with the ground to elevate the vehicle as a jack and to operate as an emergency brake.

4. A jack and brake for motor vehicles comprising ground engaging members, toggle levers connected with said members, means for supporting said toggle levers, an operating lever, a shaft adapted to be operated by said lever, cranks connected to said shaft and means connecting said cranks with said ground engaging members and toggle members to brace and operate said ground engaging members.

5. A brake and jack for a motor vehicle including axle engaging means, ground engaging members, means adapted to support said ground engaging members pivotally to said axle engaging means, operating and stay rods, cranks connected to said operating and stay rods, a shaft connected to said cranks and an operating lever adapted to operate said shaft to cause said operating and stay rods to move said ground engaging members therefrom.

OSCAR J. OLM.